3,009,906
HALOGENATION OF SOLID RESINOUS POLYMERS OF ALKENYLAROMATIC COMPOUNDS WITH GASEOUS HALOGENS
Jacob Eichhorn, Louis C. Rubens, Charles E. Fahlgren, and George J. Pomranky, all of Midland, Mich., assignors to The Dow Chemical Company, Midland, Mich., a corporation of Delaware
No Drawing. Filed May 9, 1957, Ser. No. 658,014
8 Claims. (Cl. 260—93.5)

This invention relates to improvements in the halogenation of solid resinous polymers of alkenylaromatic compounds by means of halogens in the gas state. It particularly pertains to a method of making halogenated products by contacting solid resinous polymers of alkenylaromatic compounds, in the absence of any liquid medium, with a gas comprising chlorine and/or bromine.

It is known to make halogenated resins by forming true or colloidal solutions of solid resinous polymers of alkenylaromatic compounds in inert liquid media such as carbon tetrachloride and passing chlorine or bromine into such liquid solutions. By such operations, the identity of the piece or pieces of the starting solid polymer is, of course, irretrievably lost. If, for example, it is desired to make chlorinated polymer beads from heads of a starting polymer, it is necessary by such methods to dissolve the beads of starting polymer into a suitable solvent, chlorinate the resulting solution, isolate a chlorinated polymer mass from the solvent medium, and reshape the chlorinated polymer mass into beads. In addition to these numerous steps, it is then usually necessary to recover or dispose of the liquid solvent.

It has now been discovered that articles of solid resinous polymers of alkenylaromatic resins can be substantially halogenated without loss of identity of the articles, and without use of a liquid medium.

It is among the objects of this invention to provide improvements in the halogenation of solid resinous polymers of alkenylaromatic compounds.

A more specific object is to provide a method for halogenating articles of solid resinous polymers of alkenylaromatic compounds without changing the shape or physical appearance of such articles and without use of a liquid medium.

A still more specific object is to provide such a method for halogenating with chlorine and/or bromine.

Further objects will be apparent in the following description of the invention.

The objects of this invention are attained in a method for halogenating articles of solid resinous polymers of alkenylaromatic compounds without loss of identity thereof and without use of liquid reaction media, which method comprises contacting such articles of solid resinous polymers of alkenylaromatic compounds, which articles have at least one dimension not greater than 0.1 inch, with a gas comprising at least one halogen having an atomic number from 17 to 35, i.e. chlorine and/or bromine.

The method is applicable to the chlorination and/or bromination of articles of solid resinous polymers of alkenylaromatic compounds, i.e. to addition polymers comprising at least a major proportion (50 or more percent) by weight of at least one compound having the formula

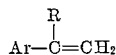

where the symbol Ar represents an aromatic nucleus, the symbol R represents hydrogen, a lower alkyl radical such as methyl or ethyl radical, or a halogen atom, and the other symbols have their customary meanings. Exemplary of such alkenylaromatic compounds are styrene, α-methylstyrene, o-methylstyrene, m-methylstyrene, p-methylstyrene, α,ar-dimethylstyrene, ar,ar-dimethylstyrene, ar-ethylstyrene, α-ethylstyrene, α-chlorostyrene, ar-chlorostyrene, ar-alkoxystyrene, and vinylnaphthalene. The polymer starting materials can be homopolymers of such alkenylaromatic compounds, copolymers or mixtures of polymers of two or more of such alkenylaromatic compounds, or copolymers or mixtures or polymers of one or more of such alkenylaromatic compounds and one or more other ethylenically unsaturated compounds such as ethylene, propylene, isobutylene, butadiene, isoprene, chloroprene, vinylchloride, vinylidene chloride, vinyl acetate, methyl acrylate or methacrylate, ethyl acrylate or methacrylate, acrylonitrile, vinylidene cyanide, vinyl ketones, maleic anhydride, sulfur dioxide, divinylbenzene, divinylnaphthalene, and ethylenically unsaturated polyesters.

The starting polymers that are substantially non-crosslinked, e.g. polystyrene, are usually thermoplastic and can be shaped into articles such as granules, beads, fibers, filaments, threads, rods, tubes, sheets, foils, ribbons, or other molded shapes. Those starting polymers that are not thermoplastic, e.g. highly crosslinked resins, are preferably shaped by sculpturing, by being molded into the desired shape during the polymerization step from the polymerizable composition, or by being formed as particles by emulsion or suspension polymerization. The polymeric composition can contain other ingredients often associated with such compositions, e.g. plasticizers, pigments and other coloring agents, fillers and similar additaments.

The halogen-containing gas can consist essentially of chlorine or bromine or mixture thereof, or can comprise chlorine and/or bromine and an inert gaseous diluent such as nitrogen or one of the noble gases. The gas mixture can range in composition from those that contain only a trace of halogen to those that contain only a trace of inert diluent. The gas can also contain a halogenation catalyst, e.g. vapors of iodine or boron trifluoride.

The method is practiced by contacting articles of solid resinous polymers of alkenylaromatic compounds, having at least one dimension and greater than 0.1 inch, e.g. particles, fibers, filaments, rods, tubes, sheets, foils, ribbons, and like shapes, with a gas comprising chlorine and/or bromine, and maintaining the halogen in such gas in contact with such articles until the resinous polymer is halogenated to an extent corresponding to at least one, e.g. from 1 to 50 or more, percent by weight of combined halogen in the polymeric article. The rate of halogenation depends, inter alia, on the kind of resinous polymer starting material, the partial pressure of halogen in the ambient gas, the temperature, the presence or absence of halogenation catalyst and the kind and concentration of such catalyst if present, and the effect of other factors such as exposure to radiations. The reaction can be carried out over a wide range of temperatures, e.g. from —70° C. or below to 100° C. or more. At the higher temperatures, e.g. above 90° C., excessive scission of polymer chains often occurs with consequent degradation of the polymer, and it is usually preferable to conduct the reaction at temperatures below about 70° C. At much lower temperatures, e.g. below 0° C., the rate of reaction is usually slower than at higher temperatures, and the reaction is more conveniently carried out above 0° C., preferably from 25° to 70° C.

The halogenation of alkenylaromatic polymer resins in accordance with this invention usually takes place partly on the aliphatic portion, e.g. the polymer chain, and partly on the aromatic nuclei, e.g. the benzene nuclei, of the polymer, and predominantly by substitution of halogen atoms for hydrogen atoms, although in some instances a minor amount of addition halogenation can also occur. Nuclear halogenation is promoted by catalysts such as iodine.

The course of the halogenation reaction between chlorine and bromine and the starting solid polymer is somewhat different from what occurs with the same starting materials when the reaction is carried out in solution in liquid reaction media.

An unexpected result of halogenation of articles of solid thermoplastic resinous polymers of alkenylaromatic compounds by the present method is the formation of chemical crosslinkages between the polymer molecules and formation of infusible, insoluble products, e.g. products that are insoluble in toluene. For example, a toluene-soluble polymer of styrene when chlorinated in solution in carbon tetrachloride in conventional fashion produces a toluene-soluble chlorinated polystyrene product. In contrast thereto, a toluene-soluble polystyrene article chlorinated in accordance with the present method produces a toluene-insoluble chlorinated article. It is suggested that formation of crosslinkages between carbon atoms of different polymer molecules occurs during halogenation in the present method by action of an activated atom or molecule of halogen removing a hydrogen atom and leaving in the polymer a carbon free-radical which becomes satisfied by reaction with a similar free-radical on another polymer molecule. The effects of such crosslinking can be observed when the extent of halogenation corresponds to as little as one percent by weight of combined halogen.

Halogenation of resinous polymers of alkenylaromatic compounds in accordance with this method causes increase in the heat-distortion temperature of the resin, i.e. the temperature at which a test piece of the resin distorts under a standard load is higher for halogenated resins made in accordance with this method than for the starting resins.

The introduction of halogen into the molecular structure of the alkenylaromatic resins by the present method also diminishes the combustibility of the resin. For example, polystyrene brominated in accordance with this invention to an extent of approximately 10 percent by weight of combined bromine is self-extinguishing, i.e. will not support combustion, although it can be burned in an incinerating flame. Polystyrene chlorinated in accordance with this invention to approximately 17 percent by weight of combined chlorine is self-extinguishing. In contrast thereto, polymerized p-chlorostyrene, containing 25.4 percent by weight of combined chlorine, supports combustion.

The following examples illustrate the invention but are not to be construed as limiting its scope.

Example 1

A stream of chlorine gas at atmospheric pressure was passed at an average rate of approximately 48 grams per hour through an agitated bed of 100 grams of polystyrene particles.

The polystyrene starting material was obtained by aqueous emulsion polymerization of monomeric styrene and spray drying of the resulting aqueous colloidal dispersion. The resulting dry polystyrene particles had an average diameter of 0.454 micron, and a solution of the polystyrene in nine times its weight of toluene had a viscosity at 25° C. of 67.9 centipoises.

Two separate experiments were carried out, the temperature being maintained at 25° C. in one and at 60° C. in the other. Samples of the chlorinated polymer particles were withdrawn from time to time, the samples being devolatilized in a vacuum oven at 50° C. and 10 Torr. (10 mm. of mercury, absolute pressure), and analyzed with the following results (values in percent by weight).

| Time Hours | Combined Chlorine | | | | | |
|---|---|---|---|---|---|---|
| | At 25° C. | | | At 60° C. | | |
| | Total Cl | Side Chain | Nucleus | Total Cl | Side Chain | Nucleus |
| 1 | 3.23 | 2.24 | 0.99 | 4.85 | 2.36 | 2.49 |
| 2 | 8.20 | 4.52 | 3.68 | 12.45 | 6.24 | 6.21 |
| 5 | 18.25 | 9.09 | 9.16 | 22.06 | 9.77 | 12.29 |

The size and appearance of the chlorinated particles were substantially the same as those of the starting polystyrene particles.

The experiment was substantially repeated with chlorine gas fed at an average rate of 51 grams per hour together with 2 grams per hour of borontrifluoride at a temperature of 25° C. After two hours, the following results were obtained (values in percent by weight) and compared with the test described above.

| BF₃ | Combined Chlorine | | | Combined Fluorine |
|---|---|---|---|---|
| | Total Cl | Side Chain | Nucleus | |
| None | 8.20 | 4.52 | 3.68 | None |
| 2 g. per hr | 13.22 | 5.15 | 8.07 | 0.89 |

These data indicate that BF₃ is a catalyst that accelerates the chlorination of polystyrene and that directs the chlorination into the aromatic nucleus.

Example 2

A stream of chlorine gas at atmospheric pressure was passed at an average rate of approximately 50 grams per hour through an agitated bed of 100 grams of particles of polymerized ar-vinyltoluene.

The polymer starting material was obtained by aqueous emulsion polymerization of a monomeric material consisting essentially of 60 percent by weight m-vinlytoluene and 40 percent by weight p-vinlytoluene and spray drying the resulting aqueous colloidal dispersion. The resulting dry polymer particles had an average diameter of 0.24 micron, and a solution of the polymer in nine times its weight of toluene had a viscosity at 25° C. of 29.2 centipoises.

Two separate experiments were carried out, the temperature being maintained at 25° C. in one and at 60° C. in the other. Samples of the chlorinated product were taken from time to time, devolatilized in a vacuum oven at 50° C. and a pressure of 10 Torr., and analyzed with the following results (values in percent by weight).

| Time Hours | Combined Chlorine | | | | | |
|---|---|---|---|---|---|---|
| | At 25° C. | | | At 60° C. | | |
| | Total Cl | Side Chain | Nucleus | Total Cl | Side Chain | Nucleus |
| 1 | 11.8 | 7.9 | 3.9 | 17 | 13 | 4 |
| 2 | 16.4 | 9.3 | 7.1 | 30 | 20 | 10 |
| 5 | 32.8 | 17.7 | 15.1 | 38 | 26 | 12 |
| 12 | 41.7 | 23.3 | 18.4 | 43 | | |

The chlorinated polymers having more than 30 percent by weight of combined chlorine were non-flammable. The chlorinated solid polymer particles had substantially the same size, shape, and appearance as the starting polymer particles.

The chlorination of the polymerized ar-vinyltoluene described above with chlorine gas containing a small proportion of BF₃ resulted in a greater proportion of nuclear chlorination and correspondingly a smaller proportion of side-chain chlorination, although the rate of total chlorination was not appreciably affected.

In other experiments, spray-dried emulsion polymerized products were chlorinated in the manner described above with substantially the same results. The rate of chlorination under otherwise similar conditions was greater with polymerized ar-alkylstyrenes such as ar-methylstyrene (ar-vinyltoluene) than for polystyrene itself. A copolymer of 4 percent by weight of acrylonitrile and 96 percent by weight of ar-vinyltoluene (a mixture of 60 parts of m-vinyltoluene and 40 parts of p-vinyltoluene), in particles having an average diameter of 0.196 microns, was chlorinated in the manner described with substantially the same results as were obtained under the same conditions with polymerized ar-vinyltoluene.

For any particular kind of polymer, the rate of chlorination was greater at higher temperatures than at lower temperatures, but was independent of the molecular weight of the starting polymer. The rate of chlorination under the conditions described was independent of the particle size for particles having average diameters less than approximately 65 microns; for particles larger than 65 microns, the rate of chlorination decreased with an increase in particle diameter.

Example 3

In the manner described in the preceding examples, a stream of chlorine gas was passed at an average rate of approximately 60 grams per hour through an agitated bed of 100 grams of polymer particles.

The polymer particles were beads having an average diameter of 540 microns. The polymer contained 60 percent by weight of m-vinyltoluene and 40 percent by weight of p-vinyltoluene polymerically combined, and a solution of the polymer in nine times its weight of toluene had a viscosity at 25° C. of 38 centipoises.

Samples of the chlorinated polymer, devolatilized at 50° C. and 10 Torr., were analyzed as follows (values in percent by weight).

| Time Hours | Combined Chlorine | | | | | |
|---|---|---|---|---|---|---|
| | At 30° C. | | | At 60° C. | | |
| | Total Cl | Side Chain | Nucleus | Total Cl | Side Chain | Nucleus |
| 2 | 6.1 | 1.9 | 4.2 | 7.5 | 5.0 | 2.5 |
| 5 | 10.5 | 4.9 | 5.6 | 12.2 | 6.2 | 6.0 |
| 12 | 15 | 6.5 | 8.5 | 17.2 | 11.5 | 5.7 |

The identity, size, shape, and appearance of the polymer beads were substantially retained during the chlorination.

Example 4

A crosslinked, toluene-insoluble copolymer of ar-vinyltoluene (a mixture of isomers in proportion of 60 parts of m-vinyltoluene and 40 parts of p-vinyltoluene) containing 8 percent by weight of divinylbenzene and a small amount of ar-ethylstyrene was chlorinated by passing a stream of chlorine gas at a rate of 42 grams per hour through 100 grams of fine particles of the copolymer at 25° C. for two hours. After devolatilization, the chlorinated product was found to contain 23.5 percent by weight of total combined chlorine and 12.9 percent by weight of side-chain combined chlorine.

Example 5

A molding grade of commercial toluene-soluble polystyrene was ground and screened to obtain two fractions, one (A) having particles passing an 18-mesh screen (U.S. Standard Sieve) and containing approximately 4700 particles per gram, the other (B) passing a 16-mesh screen but not passing an 18-mesh screen (U.S. Standard Sieve) and having approximately 860 particles per gram.

In a series of tests, 20-gram samples of these granular particles were chlorinated by passing a stream of chlorine gas upward through a bed of the particles at 30° C. for periods of time shown in the table below. After the chlorination treatment, the samples were devolatilized at 100° C. and approximately 5 Torr., and were analyzed. The table below shows the total combined chlorine in percent by weight. The table also shows the burning characteristics of the chlorinated products.

| Polymer Fraction | Time Hours | Combined Chlorine, Percent | Burning Characteristics |
|---|---|---|---|
| A | 4 | 8.3 | burns. |
| | 8 | 12.2 | Do. |
| | 20 | 17.3 | self-extinguishing. |
| | 36 | 21.8 | Do. |
| | 48 | 23.1 | Do. |
| | 84 | 29.6 | Do. |
| | 120 | 31.2 | Do. |
| B | 1 | 1.4 | burns. |
| | 2 | 2.3 | Do. |
| | 3 | 2.6 | Do. |
| | 4 | 3.3 | Do. |
| | 6 | 5.4 | Do. |
| | 16 | 10.6 | Do. |
| | 36 | 13 | Do. |
| | 96 | 19 | self-extinguishing. |

In both of these series, the degree of chlorination is approximately a linear function of the square-root of time, suggesting that the rate of reaction is primarily a function of the rate of diffusion of the gas into the polymer. All of the chlorinated products shown in the preceding table were insoluble in toluene, giving evidence of being crosslinked.

The chlorinated polymer shown under B (96 hours) that contained 19 percent by weight combined chlorine was compression molded at 190° C. and 5000 p.s.i. to obtain a molding having a heat distortion temperature of 118° C. A similar molding of the starting polystyrene had a heat distortion temperature of 82° C.

Example 6

Polystyrene films 0.001 and 0.002 inch thick were chlorinated by chlorine gas at 30° C., the chlorination being principally into the aliphatic chains of the polymer. A chlorinated polystyrene film obtained in this manner and having 30 percent by weight of combined chlorine would not ignite in a gas flame. The chlorinated polystyrene film was swellable but not soluble in toluene. When films of polystyrene were chlorinated with chlorine gas containing vapors of iodine at 30° C., the rate of chlorination was increased and a larger proportion of the chlorination was directed to the aromatic nuclei of the polymer.

Example 7

Vapors of bromine were passed through an agitated bed of polystyrene particles of the kind used in Example 1 at approximately 25° C. with the following results (combined bromine values in percent by weight).

| Br$_2$, Rate, gms./hr. | Time, Hours | Combined Bromine | | |
|---|---|---|---|---|
| | | Total Br | Side Chain | Nucleus |
| 122 | 1 | 8.95 | 3.50 | 5.45 |
| 106 | 1.3 | 11.56 | 3.87 | 7.69 |
| 65 | 2 | 12.80 | 5.05 | 7.75 |

When polymerized ar-vinyltoluence of the kind used in Example 2 was brominated with vapors of bromine at 25° C. and at an average rate of 59 grams per hour for two hours, the brominated polymer contained 17.37 percent by weight total combined bromine and 4.65 percent by weight of aliphatic side-chain combined bromine.

What is claimed is:

1. A method of crosslinking the polymer in a solid thermoplastic resinous polymer article, which article has at least one dimension that is not greater than 0.1 inch and wherein the resinous polymer contains at least 50 percent by weight of an alkenylaromatic compound polymerically combined therein, by contacting such solid article with a gaseous atmosphere comprising at least one molecular halogen selected from the group consisting of chlorine and bromine and maintaining such solid article in contact with such halogen-containing gaseous atmosphere at a temperature between −70° and 100° C. and above the dew point of the gaseous atomosphere until the article is halogenated to an extent corresponding to from 1 to 50 percent by weight of halogen chemically combined with the polymer in such article.

2. A method according to claim 1 wherein the alkenyl-aromatic compound is styrene.

3. A method according to claim 1 wherein the alkenyl-aromatic compound is an ar-vinyltoluence.

4. A method according ot claim 1 wherein the resinous polymer consists essentially of polystyrene.

5. A method according to claim 1 wherein the resinous polymer consists essentially of polymerized ar-vinyltoluene.

6. A method according to claim 1 wherein the solid resinous polymer article is in the form of solid granules.

7. A method according to claim 1 wherein the temperature is between 25° and 70° C.

8. A method of crosslinking the polystyrene in solid thermoplastic granules of polystyrene having dimensions not greater than 0.1 inch by contacting such solid granules of polystyrene with a gaseous atmosphere comprising chlorine and maintaining such contact at a temperature between 25° and 70° C. and above the dew point of the gaseous atmosphere until the polystyrene is chlorinated to an extend corresponding to from 1 to 50 percent by weight of chlorine chemically combined with the polystyrene.

References Cited in the file of this patent

UNITED STATES PATENTS

| | | |
|---|---|---|
| 1,544,531 | Ellis et al. | June 30, 1925 |
| 2,276,951 | Fisher | Mar. 17, 1942 |
| 2,513,330 | Kaganoff | July 14, 1950 |
| 2,566,567 | Hutchinson et al. | Sept. 14, 1951 |